(12) United States Patent
Packwood (10) Patent No.: US 7,006,992 B1
(45) Date of Patent: Feb. 28, 2006

(54) RISK ASSESSMENT AND MANAGEMENT SYSTEM

(75) Inventor: Thomas R. Packwood, Darien, CT (US)

(73) Assignee: Union State Bank, Orangeburg, NY (US)

( * ) Notice: Subject to any disclaimer, the term of this patent is extended or adjusted under 35 U.S.C. 154(b) by 0 days.

(21) Appl. No.: 09/544,400

(22) Filed: Apr. 6, 2000

(51) Int. Cl.
*G06F 17/50* (2006.01)

(52) U.S. Cl. .......................................... 705/38; 705/36
(58) Field of Classification Search .................. 707/3; 703/17
See application file for complete search history.

(56) References Cited

U.S. PATENT DOCUMENTS

| | | | |
|---|---|---|---|
| 6,202,060 B1 * | 3/2001 | Tran | 707/3 |
| 6,223,143 B1 * | 4/2001 | Weinstock | 703/17 |
| 6,421,653 B1 * | 7/2002 | May | 705/37 |

OTHER PUBLICATIONS

"Risk Management & Analysis"—Alexander, Carol John Wiley & Sons (vol. 1 & 2) 1996.*
"Advanced Strategies in Financial Risk Management"— 1993—Schwartz R—New York Institute of Finance.*

* cited by examiner

*Primary Examiner*—Vincent Millin
*Assistant Examiner*—Thu Thao Havan
(74) *Attorney, Agent, or Firm*—Notaro & Michalos P.C.

(57) ABSTRACT

A method of analyzing and presenting a series of risk factors associated with the operation of a business, such as a bank. Quantifiable risk factors are identified. Ranges of acceptable and unacceptable values for the factors are selected and arranged to each factor. Each risk factor has an immediacy value, or risk tolerance, assigned to it. A business is evaluated by measuring the actual values for each factor found in the business, comparing the actual values to the user-defined acceptable value ranges for each factor and creating a report identifying unacceptable valued risk factors and their immediacy value to the business. The measuring, evaluating and reporting may be automated using a computer, or portions can be done manually.

23 Claims, 4 Drawing Sheets

RISK ASSESSMENT AND MANAGEMENT SYSTEM

FIELD AND BACKGROUND OF THE INVENTION

The present invention relates to a business management tool and, more particularly, to a new and useful method for identifying, evaluating and responding to risks associated with a business operation, such as in a financial institution.

Effective business management depends on many different factors, including personnel, facilities and systems. Small businesses can be operated relatively efficiently when the scale of business operations is such that the owner can easily know how each aspect of the business is doing. Once a business grows so that additional tiers of management are needed, it becomes increasingly difficult for a single person to effectively understand how all parts of the business are operating. Often, the details of how parts of a business operate are lost as information about each part flows upward in summaries and status reports. At the same time, it is not efficient for an upper-level manager or medium to large business owner to constantly oversee each individual operation of the business.

Many factors affecting the overall operation of a business can be measured and quantified using definite values. For example, most companies prepare and review balance sheets and income statements to evaluate their health and operating efficiency. These statements measure and quantify the financial health of a company by taking a "snapshot" of the company's financial position at a given moment in time.

Another important criteria that can be evaluated for a business is the risk associated with different facilities, activities and functions of the business. Generally, risk is a measure of the potential loss versus gain for any given act or omission related to a business operation. For a given risk, there are levels, or values, which quantify the risk and can be used to determine if the risk is too great to be acceptable. If the risk associated with a particular business can be managed effectively, the business should operate efficiently and remain a viable, ongoing concern.

The operation of a business often entails many different aspects and details which are sometimes difficult to compile and present in a manageable format to the persons in position to act on the information. Different risks to a business may exceed planned parameters set to help manage the particular risks, but that information does not reach the management due to lack of communication or information systems breakdowns. In such a case, the risks to a business become unmanaged, and the likelihood that the business will fail or perform less efficiently is greatly increased.

Therefore, it is especially desirable to provide business management, especially at the board of directors level, with a concise, efficient and prompt mechanism for reviewing risk factors which may proliferate through voluminous reports that encompass complex and numerous business operations. The provision of such mechanisms can become especially important in the operations of financial institutions, such as banks, since early identification and assessment is needed to assure sound fiscal management and detect potential fraud.

Several patents disclosing predictive methods for evaluating risk and offering risk management tools for businesses are known.

U.S. Pat. No. 5,963,910 describes a computer-based management system that enables users to optimize a strategy for defining overall risk management choices. "Predictive metrics" are employed for quantifying outcomes of a particular business mission. A predictive metric is a parameter that can be measured and controlled by the agent, e.g. a manager, responsible for controlling the desired outcome. A software program evaluates and optimizes business strategies based on the mission and prioritized desired outcomes. The software uses data processing subroutines to analyze the relationship between sets of data and determinative factors, such as predictive metrics, are formulated to identify factors which yield an optimal solution. The determinative factors are linked together, so that optimizing one factor will cause the program to evaluate its negative effects on other factors. Multiple strategies can be evaluated using the program by changing the mission and the input priorities, as well as other variables.

Factors are evaluated using predictive metrics which are normalized on a scale of 1–10 and then prioritized based on the normalized value. The value can be displayed graphically using a bar which is sized proportionately to the value. Depending on the desired outcome, the predictive metrics are ranked from highly desirable to unimportant. FIGS. 19–23 of U.S. Pat. No. 5,963,910 show the ranking and table display of the predictive metrics (referred to as Appendices A-1 to A-5 in the description of the drawings at column 12). The metrics are preprogrammed as part of the software based on prior selection and/or research.

U.S. Pat. No. 5,696,907 relates to a system and method of conducting risk and credit analysis of financial service applications, such as car loan applications. A pre-programmed neural network computer is used to make decisions normally made by a credit manager. Related data in each application are placed together in groups, such as employment stability, credit history, etc. Each group contains variables used to evaluate the risk and credit.

The variables that are used by the system are then quantified as numeric or categorical values. Prior history data is entered to produce a range of values for each numeric variable. The range of values is normalized. Then, the vulnerability of each categorical data is determined by mapping what proportion of prior applicants in each category have produced unacceptable results minus what proportion have produced acceptable results. A series of heuristic rules are programmed and the prior history data is processed using the rules and regression analysis to weight the different variables. Data from a new application may then be processed against the weighted neural network system to determine if the application will be approved or denied.

U.S. Pat. No. 5,852,811 teaches a program for managing personal financial information. One aspect of the invention includes an assessment of the investment risk preferences of the user. A report can be generated to assist the user in selecting investments based in part on the risk preferences input previously. The report prioritizes the investments based on programmed optimization functions using the input from the user and available financial data. A specific report form and risk assessment method is not provided.

Other patents of interest teaching database methods include U.S. Pat. No. 5,227,967 for a method of managing security instrument data using categorized information stored in a database. First, different types of investment assets are categorized by attributes. The attributes are in turn placed in functionally related groups. For a given security instrument, only data for the attributes contained in the functionally related groups identified with that type of instrument is stored and retrieved to make reports about the status of that instrument.

U.S. Pat. No. 3,703,630 discloses a monitor board for identifying the utilization of production facilities using luminescent strips. Different products are identified at different locations on the board. The amount of lighted strip is proportionate to the quantity being displayed. A computer having an optimization program drives the display and can show percent use, marginal cost of production and other numbers associated with product production using limited plant facilities. The computer and monitor board are used to provide rapid "what if" analysis of one or more production facilities.

A task management system incorporating a bar chart in which the area contained by each bar represents the amount of resources needed can be found in U.S. Pat. No. 5,016,170. A computer-driven composite display of many related tasks is assembled by determining the tasks to be completed and showing the tasks as rectangular bars. The orientation and sizes of the bars relative to each indicate dependency of completion of one task on another and the time and resources needed to complete each task. The system is particularly well suited to construction crew management. Values for bars may be adjusted by changing the inputs to the computer, driving the display.

U.S. Pat. No. 5,095,429 is for a financial information system having a provision for prioritizing data. Data is entered into a cell in an input window. If the cell is locked, it is prioritized over data previously entered in other cells, and any recalculation is based on the locked cell, which is not permitted to change.

None of the prior systems provide or suggest a method for evaluating and managing risk by selecting criteria and assigning both risk and relevancy levels. While one of the prior methods is an evaluation method using weights to prioritize factors, the values of the factors are not taken from current business operations and are predictive metrics only. Similarly, the prior credit risk evaluation method uses normalized prior numeric data to determine the vulnerability of a particular category of data, and then it compares new application data using programmed rules and preset vulnerability calculations for each criteria. Each piece of application data is not evaluated for compliance with a standard, but rather, a rule is applied to combined data in order to predict future performance based on prior results.

A method for providing a snapshot of the current levels of risks associated with the operation of a business is needed to help evaluate business performance and assess compliance with standards set by the owner or Board of Directors, identify otherwise undetected risks and aid in the overall management of a business.

SUMMARY OF THE INVENTION

In accordance with the invention, a business risk assessment and management reporting method is provided which includes identifying a series of predetermined risk factors associated with the operation of a business such as a bank, evaluating each risk factor to determine risk level values for each risk factor, determining the actual risk level for each of the risk factors and generating a risk management report having visual indicates displayed with each risk factor.

It is an object of the invention to provide a method of evaluating a business using a time-fixed snapshot report of risk factors.

It is a further object of the invention to provide a mechanism for centralizing and automating reporting of the risks associated with a business to allow more accurate evaluation of the business risk versus reward equation.

Another object of the invention is to provide a method whereby management personnel can set criteria for risk factors determined to be important to operating a business and then quickly evaluate the business based on the criteria. The risk factors are all quantified with a measurable characteristic.

In accordance with a preferred embodiment of the method of the invention, three ranges of risk level values—danger, caution and normal risk level—are selected for each of the chosen risk factors. The ranges for each risk factor are determined based on management's perception of what values are acceptable for each factor for the normal range, how large a warning range is desired for the caution range for each factor and at what point the measured value of the risk factor indicates a danger to the business operation. As used herein, management is intended to include the owner of a business, the Board of Directors of a corporate type entity, executive officers of a company and other management level personnel charged with operation of one or more business units of a company.

The ranges may be selected by upper management personnel or by operating managers who may be closer to day-to-day considerations which cause fluctuations in risk that have been identified for evaluation. Factors which are considered high risk, or low tolerance, may have their ranges set or reviewed by executive personnel or a Board of Directors.

Each of the risk factors and their assigned ranges of risk level values are further categorized by the immediacy of the factor to the operation of the business; that is, its time-sensitivity, importance and overall ranking as a critically important factor. A "risk tolerance" value is then assigned to the risk factor.

Once the risk factors have been determined, risk level ranges set and risk tolerances identified, the system provides measurements of existing risk which can be compared by various weightings of the risk factors.

Another aspect of the invention is a report which presents the comparison of desired and actual levels of risk for each risk factor in a form of visual indicia, such as a chart using color coding and grouping, to permit a user to quickly identify problems and areas of concern. Thus, in accordance with a further aspect of the invention, the inventive method provides risk assessment management in a unique, color-coded report format. The report can be broken into sections for each level of risk tolerance so that urgent, low risk tolerance factors which have an unacceptable risk level are more noticeable and are not confused with higher tolerance items with unacceptable risk levels.

In a further embodiment of the invention, the report includes a detailed action plan for risk factors identified as being outside of the acceptable range. The action plan supplements the brief format of the report to provide explanations for each risk factor which is outside the acceptable range, identify the current status of the risk factor and propose a corrective action plan for evaluation by management receiving the report. Thus, the report can be quickly viewed to determine problem areas, while the detailed action plans can be reviewed based on the managements' perception of which problems are most critical to the business.

The various features of novelty which characterize the invention are pointed out in detail in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
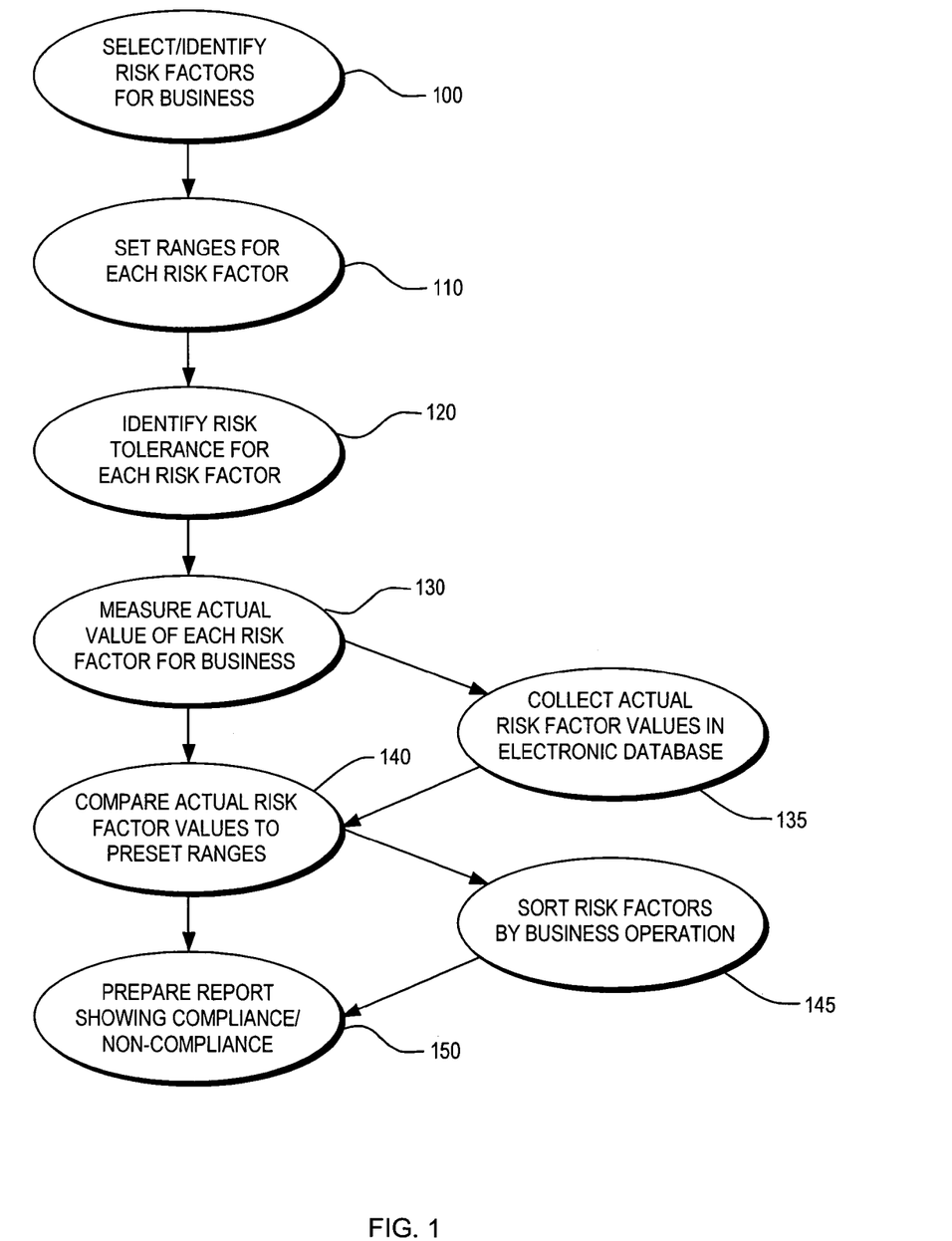
FIG. 1 is a flowchart showing the method of the invention.

Referring now to the drawings, in which like reference numerals are used to refer to the same or similar elements, FIG. 1 illustrates the steps for using the risk assessment and management method of the invention. The method relies upon the principle that if the risks associated with a business are managed properly, then the business will operate efficiently and remain a viable entity. The method is designed to permit a senior level manager of a business to quickly obtain and evaluate a business operation with many different aspects in order to efficiently manage each of the different aspects without having to know the details of each aspect. As noted above, used herein, management is intended to include the owner of a business, the Board of Directors of a corporate type entity, executive officers of a company and other management level personnel charged with operation of one or more business units of a company.

The method of the invention permits the management of a business to select risk factors and identify the parameters for each risk factor. A report is generated based on the comparison of actual risk values for the risk factors. The report is an exception reporting mechanism which quickly identifies non-compliant risk factors. The risk factors and parameters, or ranges of risk level values, may be periodically reviewed by management for applicability to the business and validity of the selected ranges.

Referring to FIG. 1, in accordance with the inventive method, a series of risk factors relating to a business operation must be selected 100. The risk factors are factors that affect the operation of the business as a viable entity. Each of the selected risk factors should be capable of being measured and quantified. Late payments received by the business, for example, can be measured and quantified by the number of days the payment is late. Other risk factors which might be selected, depending on the type of business, include: differences between interest rate on savings and interest rate on loans; rate of turnover of employees; days of product in inventory; accounts receivable aging; or the number of loans in default. Any number of risk factors which are believed to be related to the success of the business can be selected.

For each risk factor selected, at least two ranges of risk level values must be set 110. One range of risk level values includes acceptable measured values for the risk factor, while the other range includes measured values which are unacceptable. The determination of what values are acceptable and which are unacceptable is typically to be made by the management of the business.

The risk level values are preferably numeric values, although alphabetic values or alphanumeric values can be used if the ranges of values can be represented on a scale in those formats, e.g. risk level values of A–C are acceptable values, D–F are unacceptable values.

Preferably, in accordance with the inventive method, there are at least three ranges of risk level values that are utilized: an acceptable range, a warning range and an unacceptable range. The warning range encompasses those risk level values for the risk factor that are both not clearly unacceptable and not completely acceptable. The risk level values in the warning range may be considered marginal risk level values, which are neither good nor bad, but can be improved. In a preferred embodiment, the warning range indicates a risk factor which is tending toward being unacceptable and requires early action to prevent the factor from becoming unacceptable.

Additional risk level value ranges can be added to fine tune the classification of the level of risk presented by each factor. The unacceptable range, for example, could be further divided to identify mildly unacceptable risk level values and seriously unacceptable risk level values. Similarly, the warning range could be expanded to three ranges covering good marginal values, marginal values and bad marginal values. The acceptable range could be divided into solidly acceptable, no improvement needed and acceptable with improvement possible ranges.

Once the risk factors have been selected 100 and risk level value ranges set 110, a risk tolerance must be assigned 120 to each risk factor. Risk tolerance is a measure of the immediacy of a given factor to the success or failure of the business and reflects the management's willingness to permit the factor to be non-compliant. A low tolerance factor is one which can bring about the demise of the business on its own if it is at an unacceptable level and not corrected. A low tolerance factor is a high risk to the business. A high tolerance factor is one which will not cause the failure of the business, but will result in decreased efficiency or preventable losses. A high tolerance factor is a low risk to the business.

The immediacy of a factor may be based, for example, on time sensitivity, which requires prompt action or upon the factor's relative importance as a critical business risk factor, or both.

In a preferred embodiment, there are three levels of risk tolerance, high, medium and low. A high tolerance risk factor is one which is not likely to cause the business to fail by its presence alone. A medium tolerance risk factor is one which could cause severe problems if not compensated for and corrected. A low tolerance risk factor is one which can singly cause the business severe damage or failure and presents a high risk to the operation of the business.

The selection of the risk factors 100, setting of the risk level value ranges 110 and assigning risk tolerances 120 are necessary so that actual risk level values for each risk factor can be measured 130 and then compared 140 to the preset risk level value ranges.

When the actual risk level values for each factor are measured 130, the measurements may be made manually, or based on data input by various parts of the business. The measurement data for each risk factor can be collected and stored 135 in an electronic database using an automated system in the latter case.

Comparing the actual risk level values to the risk level value ranges 140 can be done using any known method for comparing data values. In a preferred embodiment the comparison is done using a simple commercially available spreadsheet program, such as Microsoft's EXCEL or Corel's QUATTRO PRO on a personal computer. These spreadsheets can be programmed with formulas used to compare the actual risk level values to the ranges and generate an output result indicating the actual risk level value and the range in which the actual risk level value falls.

Finally, once the comparison 140 has been completed, a report is generated 150 which is color-coded to provide a fast visual indication of which risk factors have actual risk level values that are in compliance with the corresponding acceptable range of risk level values. When three ranges are used, green is used to indicate compliance with the acceptable range, yellow for the warning range and red to indicate a risk factor with an actual risk level value in the unacceptable range.

The risk factors associated with a particular business operation or portion of the business can be sorted and grouped together 145 prior to further enhance the information presented to management by the report. For example, risk factors relating to production can be grouped separately from those relating to sales, or risk factors for one physical location of the business can be separated from those of a second physical business location.

Figure 2:
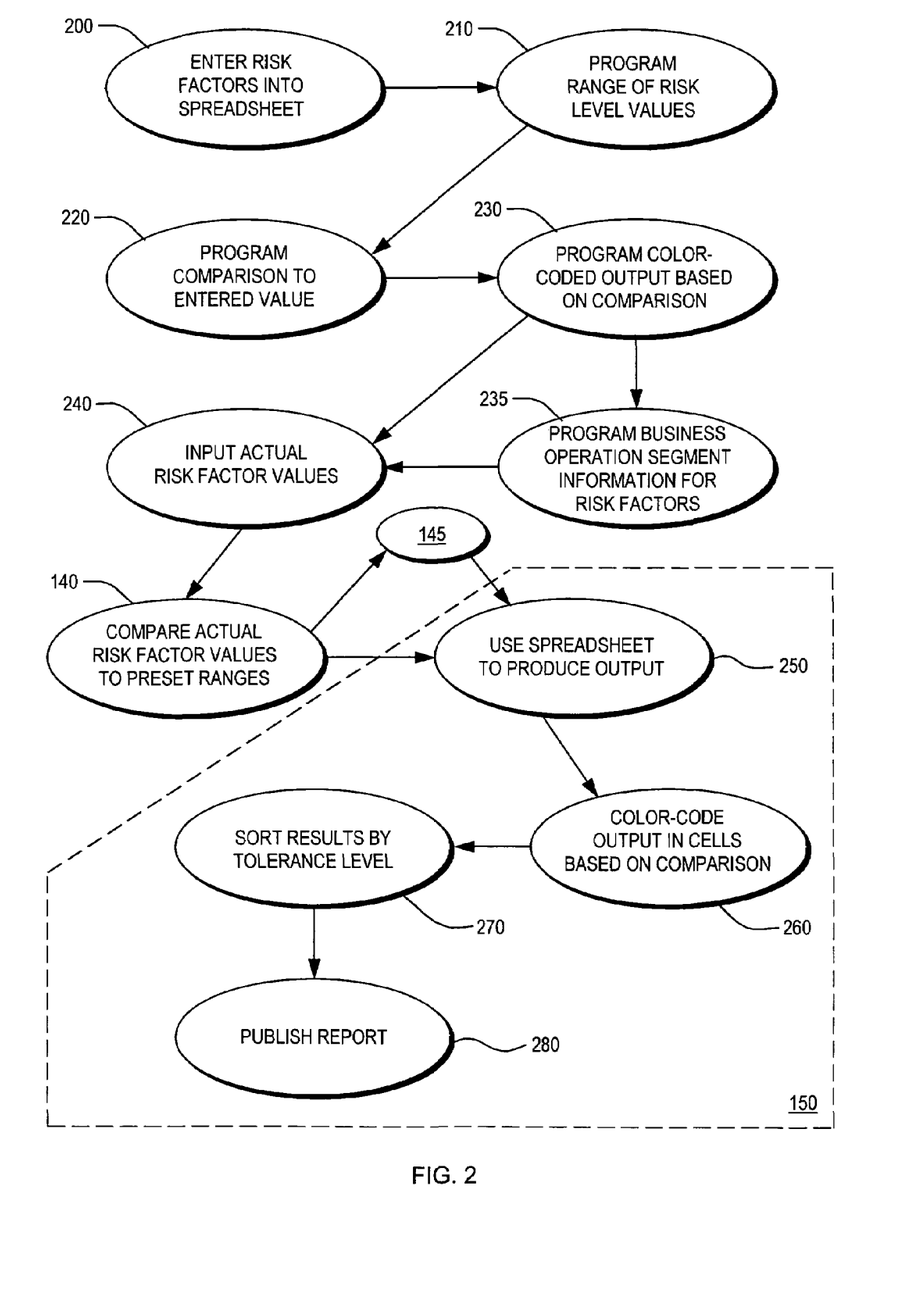
FIG. 2 is a second flowchart identifying steps for preparing a report of results obtained using the method of FIG. 1.

FIG. 2 shows how a spreadsheet program can be programmed to compare measured actual risk level values to preset ranges to produce a report. The risk factors selected in step 100 are entered 200 into the spreadsheet. The ranges of risk level values are programmed 210 for each risk factor. Then, a comparison algorithm is programmed 220 to compare entered values to the preset ranges. A color-coded output is programmed 230 corresponding to the result of the comparison.

A code indicating the segment of the business operation each risk factor relates to can be programmed as well for use in sorting and grouping 145 related factors.

After the spreadsheet is programmed, the actual risk level values are entered 240 into the spreadsheet, either manually or by extraction from a database, such as Microsoft ACCESS, as described above. The actual values are compared 140 with the preset ranges, and the spreadsheet is then used to produce 250 an output showing the actual value corresponding to each entered risk factor. The outputs are color-coded 260 depending on the results of the comparison with the programmed ranges of risk level values to indicate acceptable or unacceptable results. Preferably three colors and ranges are used, so that each risk factor is described and a color coded bar is used to show compliance (green), caution (yellow) or non-compliance (red). The numeric value, used to determine risk level range in which the measured risk factor falls, is also presented for assessment of the severity of the identified problems.

The tabulated results can be sorted 270 by tolerance level as well, so that low tolerance risk factors are presented first as a group for rapid action, while higher tolerance level factors are presented separately for less urgent action. Finally, the report is published 280 for review by management to use in operating the business. The report may be published on paper, or wholly electronically, through HTML computer language or other standardized digital formats for publishing documents.

In a further embodiment of the invention, once an initial measurement has been taken and subsequent measurements are available, a further report is used to summarize changes occurring since a previous measurement. Comparison of the initial and subsequent measurements allows new non-compliant and caution factors to be identified so that management can determine the reason for any adverse deviation from previously acceptable or cautionary values. New compliant factors are identified to confirm the effects of remedial actions taken previously in response to warnings from the reports.

The measurements and reports can all be compiled manually using a simple spreadsheet program, such as Microsoft's EXCEL or Corel's QUATTRO PRO. Alternatively, inputs for measured values of each risk factor may be taken from a networked database and supplied to a database program, such as Microsoft ACCESS.

Regardless of the input, the spreadsheet program then compares the actual value of the risk level for each factor to the predetermined ranges and presents the information using color coding for easier identification. The risk factors may be prearranged by risk tolerance, or coded for sorting. The main report is compared to previous versions, when available, to produce the second report listing changes in status of risk factors.

Figure 3:
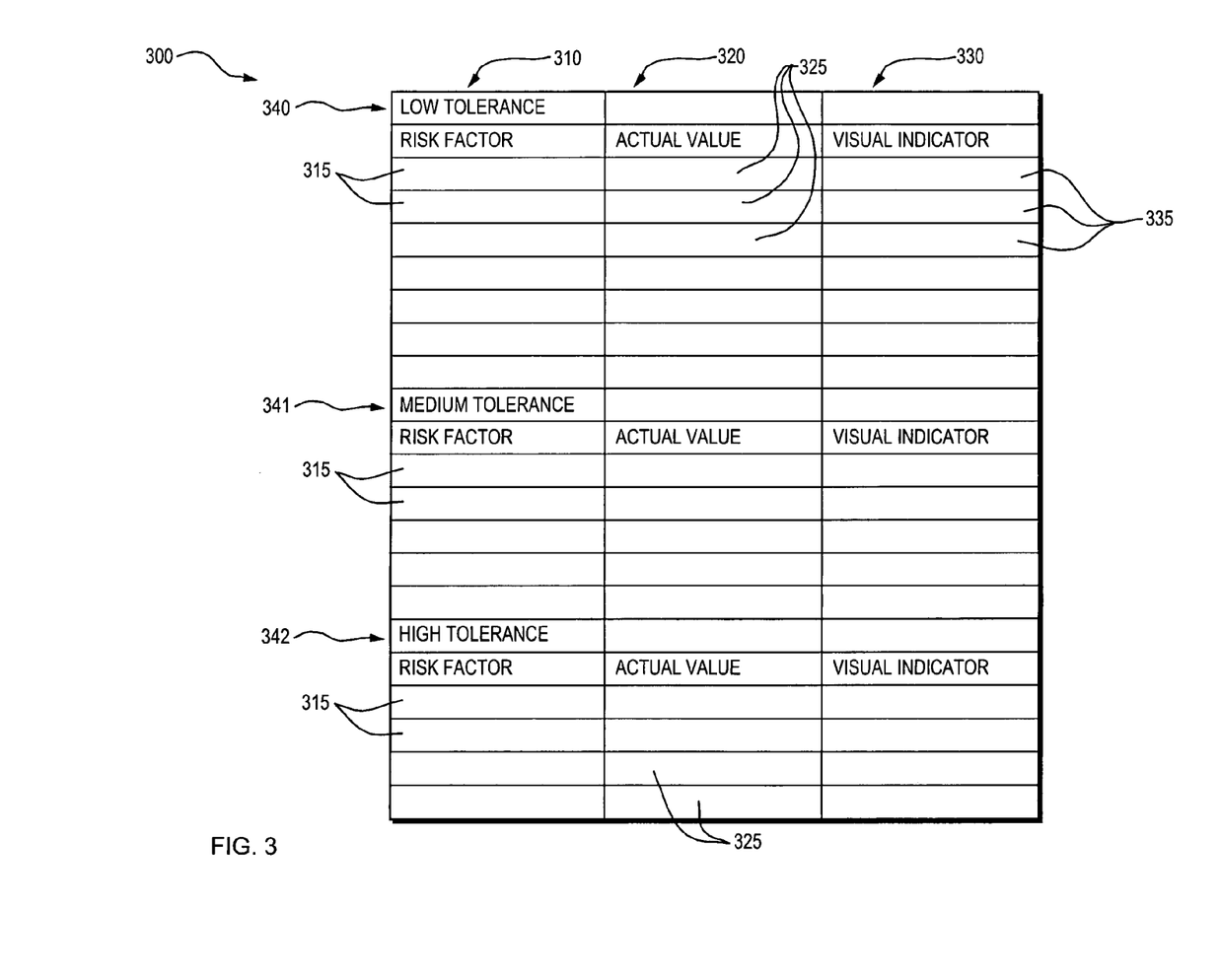
FIG. 3 is a sample report sheet used to present the risk assessment information of the method of the invention to a manager or business owner.

FIG. 3 displays a spreadsheet report table 300 used to compare and report the risk factor assessment, such as can be done using Microsoft's EXCEL or Corel's QUATTRO PRO. The first column 310 identifies each risk factor with a text label for each factor in cells 315. The second column 320 indicates the actual measured value of the risk factor in the corresponding row of the first column 310. The third column 330 can include a visual indicator of whether the actual value in the corresponding row of second column 320 is in compliance or not, such as a green bar for compliance, red for non-compliance and yellow for caution when three ranges are used.

The risk factors in table 300 are sorted by risk tolerance level as well, as shown by header rows 340, 341, 342, which indicate one of three tolerance levels. Low tolerance items are listed first below header row 340, since they are most essential to the operation of the business being evaluated in the report table 300. Medium tolerance items are identified below header row 341, and high tolerance items are listed last below header row 342.

Each cell 325 in column 320 is programmed to compare the entered actual values in the cells 325 to the pre-selected ranges of risk level values for the corresponding risk factors. The cells 335 in the visual indicator column 330 are programmed to display an appropriate visual indicator, using the color coding of green, yellow and red when three ranges of risk level values are used, which represents the outcome of the comparison of each entered actual value to the pre-selected ranges in the cells 325 of the second column 320. The actual values entered into cells 325 may be input manually, or they may be extracted from a database using object linking or other similar data extraction methods.

Figure 4:
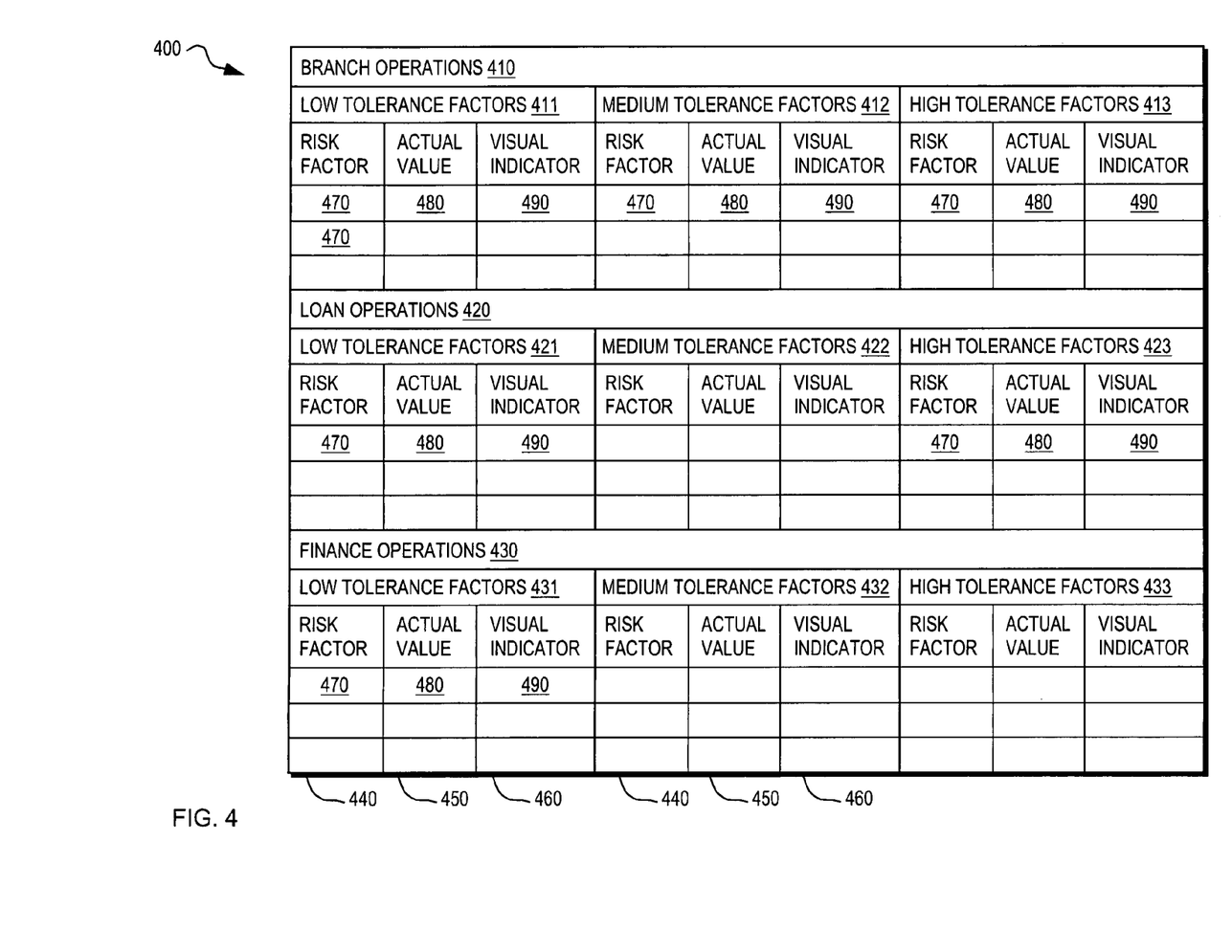
FIG. 4 is a second embodiment of a report sheet.

Alternatively, the report can be formatted so that different tolerance level risk factors are presented in side-by-side columns or on separate report pages. FIG. 4 shows one such report table 400 which has grouped risk factors according to a particular business operation, such as for a bank or lending institution, identified in operation description rows 410, 420, 430. Header columns 411, 412, 413 for each risk tolerance are provided below each operation description row 410, 420, 430. A group of three columns 440, 450, 460 for identifying the risk factor, actual risk value and a visual indicia, respectively, is provided under each header column 411, 412, 413 within each grouping identified by an operation description row 410, 420, 430.

The individual risk factors are identified in cells 470, with the associated actual risk level value presented in an adjacent one of cells 480 and a corresponding visual indicia in an adjacent one of cells 490 to visually show the compliance of the risk factor.

Additional operation description rows can be added where more departments or divisions exist in the business, or fewer can be used as needed.

As shown in FIG. 4, low tolerance risk factors are shown in the left-most group of columns 440, 450, 460, medium risk factors in the center group, and high tolerance factors in the right-most group 440, 450, 460. This arrangement of the risk tolerances is selected due to the English language convention of reading from left to right, so that the low tolerance factors will be read or seen first, due to the immediacy of these items and to stress their importance. Clearly, for different cultures or language tendencies, the columns may be rearranged as appropriate to indicate the same characteristics.

The reports 300, 400 of FIGS. 3 and 4 are particularly useful when 50 or more risk factors are selected, since the color code indicator immediately shows the management reviewing the report whether a risk factor: a) is in compliance or not and b) requires attention immediately or in the near future. The presentation of the report allows for both a quick review of many hundreds of risk factors for non-compliance and immediate action, and a more thorough reading of the detailed values for each risk factor at a later time. Without the reports 300, 400, management would potentially have to review many text reports from each business area under his/her purview and then obtain additional detailed information about each reported problem.

The following examples of implementing the method are provided to show how the invention can be applied to small and large businesses to provide rapid assessments of risk.

EXAMPLE 1

The business which will be evaluated using the risk assessment method is a small retail store. First, the owner of the retail store business determines what risk factors apply to the successful operation of the business. The factors must be measurable and quantifiable. For this example, the factors selected are: monthly gross sales, value of inventory over 30 days old, monthly dollar value of returns, monthly value of inventory losses due to theft, damage, etc., monthly operating costs and monthly net profit. Other factors could be selected for a more detailed report, but for the purposes of this example, only these factors will be used.

Acceptable and unacceptable risk level value ranges for each risk factor are selected as follows:

| Risk Factor | Acceptable Values | Unacceptable Values |
| --- | --- | --- |
| Monthly Gross sales | $20,000 or more | $19,999 or less |
| Value of Old Inventory | $10,000 or less | $10,001 or more |
| Value of Returns | $4,000 or less | $4,001 or more |
| Value of Losses | $500 or less | $501 or more |
| Monthly Operating Expenses | $5,000 or less | $5,001 or more |
| Monthly net Profit | $10,500 or more | $10,501 or less |

These risk factors are used to label rows, and the corresponding ranges are programmed into adjacent cells in an EXCEL spreadsheet as formulas so that actual values for each risk factor can later be entered into the spreadsheet cell and compared to the pre-selected ranges above.

Each risk factor is then assigned a relevancy, or risk tolerance level, of low, medium or high tolerance for unacceptable measured values based on the importance to the overall success of the business. The monthly gross sales, and monthly net profit are assigned low tolerance levels, while the value of returns, value of losses and monthly operating expense are assigned to the medium tolerance level, and the value of old inventory is assigned the highest tolerance level.

The actual values for each identified risk factor are determined using known business report information. In this example, the actual values used for each factor are, respectively, $30,534, $8,789, $7,432, $555, $4,932 and $17,692. These numbers are entered into the corresponding pre-assigned spreadsheet cell, which uses the programmed formula to compare the entered actual value to the pre-selected ranges, above, and determines which range the entered actual value is within. A visual indicator, such as color code, is produced in the cell adjacent the actual value in the same row, and the table is sorted by risk tolerance level, from lowest to highest. The sorted and color coded report is generated as follows (displayed colors in parentheses):

| Risk Factor | Actual Values | Visual Indicator |
| --- | --- | --- |
| | Low Tolerance | |
| Monthly Gross Sales | $30,534 | [Green] |
| Monthly Net Profit | $17,629 | [Green] |
| | Medium Tolerance | |
| Value of Returns | $7,432 | [Red] |
| Value of Losses | $555 | [Red] |
| Monthly Operating Expenses | $4,923 | [Green] |
| | High Tolerance | |
| Value of Old Inventory | $8,789 | [Green] |

Using the report, the business owner can quickly see that while sales and profits are acceptable, there are unacceptable losses from theft or damage and returns of merchandise are excessive.

EXAMPLE 2

A second business which is evaluated using the method of the invention is a regional bank. The bank has thirty branches and a central headquarters. The central headquarters comprises operations such as loans, finance, data processing and compliance. The management at the central administration location wants to be able to assess their day-to-day branch operations, as well as the centralized functions of the headquarters location. The bank identifies about three hundred risk factors which are grouped according to whether they relate to branch operations or to one of the central headquarters operation areas. The bank divides the risk factors according to whether they as associated with branch operations, the bank's loan department, its finance department, the data processing operations or the compliance department.

Some of the branch operations risk factors which are selected include: latest compliance regulatory exam rating, quarterly teller over and short count, open audit and regulatory findings over twelve months old, variance of year-to-date budget versus actual operating income, number of branch manager meetings during past twelve months, current internal audit rating for each branch, number of branches reporting operating losses in last quarter, and months since last approval of branch operations policy. Loan operations risk factors which are selected include: loan allowance as a percentage of total loans, number of loan officers with portfolios greater than $100 million, asset quality rating, percent of loans to total assets, net interest yield on loan portfolio, number of appraisals not reviewed by in-house reviewer, mortgage loans with expired hazard insurance, and percentage of total loans outside lending area of the Bank. Finance department factors include: net interest income as a percent of average assets, return on common equity, legal risk self-assessment, investments as a percent of total assets, return on assets, and months since last approval of finance operations policies. These lists of factors are not intended to be exhaustive, but are only exemplary of the hundreds which are used.

Three ranges of risk level values are chosen for each risk factor—an acceptable level, a warning level and an unacceptable level. Then, a low, medium or high risk tolerance level is assigned to each risk factor. The different risk factors are sorted by branch or central operations factors, and low, medium and high tolerances and are entered into an EXCEL spreadsheet, portions of which include the risk factors identified above, as follows:

| | Risk Factor | Actual Value | Visual Code |
|---|---|---|---|
| | Branch operations | | |
| Low Tolerance | | | |
| 1. | Quarterly Teller Over & Short count | 3872 | [Green] |
| 2. | Open Audit and Regulatory Findings over 12 Months old | 1 | [Yellow] |
| Medium Tolerance | | | |
| 3. | Variance of Year-to-Date Budget versus Actual Operating Income | 9.4% | [Green] |
| 4. | Number of Branch Manager Meetings During Past 12 Months | 10 | [Green] |
| 5. | Current Internal Audit Rating for Smith Branch | 3 | [Yellow] |
| High Tolerance | | | |
| 6. | Number of Branches Reporting Operating losses in Last Quarter | 1 | [Green] |
| 7. | Months Since Last Approval of Branch Operations Policy | 5 | [Green] |
| | Loan Operations | | |
| Low Tolerance | | | |
| 1. | Loan Allowance as a Percentage of Total Loans | 1.3% | [Green] |
| 2. | Number of Loan Officers with Portfolios Greater than $100 Million | 5 | [Red] |
| Medium Tolerance | | | |
| 3. | Percent of Loans to Total Assets | 58.8% | [Green] |
| 4. | Net Interest Yield on Loan Portfolio | 5.4% | [Green] |
| 5. | Number of Appraisals Not Reviewed by In-house Reviewer | 10 | [Red] |

-continued

| | Risk Factor | Actual Value | Visual Code |
|---|---|---|---|
| High Tolerance | | | |
| 6. | Mortgage Loans with Expired Hazard Insurance | 4 | [Green] |
| 7. | Percentage of Total Loans Outside Lending Area of the Bank | 0.2% | [Green] |
| | Finance Department | | |
| Low Tolerance | | | |
| 1. | Net Interest Income as a Percent of Average Assets | 3.75% | [Green] |
| 2. | Return on Common Equity | 14.7% | [Green] |
| 3. | Legal Risk Self Assessment | GREEN | [Green] |
| Medium Tolerance | | | |
| 4. | Investments as a % of Total Assets | 34.1% | [Green] |
| 5. | Return on Assets | 1.19 | [Green] |
| High Tolerance | | | |
| 6. | Months Since Last Approval of Policies | 15 | [Yellow] |

The complete table contains several hundred risk factors for many other areas of bank operations. For simplicity and space considerations, the report table is truncated as shown to include only some of the factors identified above as being related to the branch, loan and finance operations.

The risk factors have been numbered sequentially under each operational segment to further improve the report and make reference to a particular risk factor easier. The risk level value ranges are programmed into the "Actual Value" cell using EXCEL formulas, and a color-coded response of red, yellow, or green is generated which represents the result of the comparison of the actual risk level value to the selected ranges for each risk factor. An unacceptable risk level value yields a red visual code. Yellow is used to indicate a factor which is close to being unacceptable, and green indicates a factor which is considered solidly acceptable.

As an example of a risk factor which is quantified by a non-numeric value, the legal risk self-assessment factor has three responses: green, yellow and red, determined according to an appropriate evaluation of the factor. Accordingly, the visual color coding for this factor relies on the entered value matching one of the three possible responses. Clearly, however, an alphabet representation of the measurement of a factor is possible.

After the table is programmed using EXCEL formulas and codes, the actual values are entered into the appropriate Actual Value cells, compared to the corresponding programmed ranges to generate the color coding in the adjacent column of cells, and the report is published for review by a senior level manager. The many risk factors which are presented in the report are easily and quickly reviewed using the color coding to identify unacceptable risk factors while acceptable factors are not examined in detail initially.

Further, for each risk factor which is identified as being in the warning or unacceptable ranges in the report of the example, or when one of the basic reports 300, 400 of FIG. 3 or 4 is used, a detailed action plan can be provided with the report. The action plan identifies the risk factor and the current status of the risk factor, and provides either a proposed corrective action for review by management or relates the corrective measures which have been undertaken for approval by management. The action plan provides additional detail about each non-compliant risk factor which can be reviewed based on the risk tolerance associated with the factor and the level of non-compliance indicated in the report.

In the case of the example, a detailed action report would be provided for each factor which has a Yellow or Red visual indicator showing non-compliance, such as the risk factor "Number of Loan Officers with Portfolios Greater than $100 Million". The action plan for this factor identifies the factor, the current status, or value, which is 5 loan officers, and the steps being taken to correct the problem evaluate the distribution of loan customers among the loan officers. Since this is a high risk/low tolerance item with a Red visual indicator showing non-compliance, the problem will be identified and the action plan reviewed sooner than the action plan for the finance department's problem risk factor "Months Since Last Approval of Policies", which is a high tolerance/low risk factor with a Yellow caution visual indicator.

Thus, management can quickly prioritize non-compliant factors using the report 300, 400 and obtain detailed information as needed, rather than having to read several detailed action plans or other lengthy text reports first to determine which items are a priority.

A second type of report that can be generated after at least one report has been prepared is a comparison of new unacceptable items and new acceptable items to show correction from prior reports and to identify both new and long term problems. The report can be generated using a "document compare" software program function to compare a prior report to the current report.

While a specific embodiment of the invention has been shown and described in detail to illustrate the application of the principles of the invention, it will be understood that the invention may be embodied otherwise without departing from such principles.

What is claimed is:

1. A risk assessment and management reporting method, comprising:
   identifying a plurality of financial risk factors affecting a financial operation being managed, the risk factors being selected from the group consisting of: late payments received; difference between interest rate on savings and on loans; rate of turnover of employees; days of product in inventory; accounts receivable aging; number of loans in default; gross sales, value of old inventory; value of returns; value of inventory losses; operating costs; net profit; latest compliance regulatory exam rating; quarterly teller over and short count; open audit and regulatory findings over twelve months old; variance of year-to-date budget versus actual operating income; number of branch manager meetings during past twelve months; current internal audit rating; number of branches reporting operating losses; months since last approval of operations policy; loan allowance as percentage of total loans; number of loan officers with portfolios greater than selected amount; asset quality rating; percent of loans to total assets; net interest yield on loan portfolio; number of appraisals not reviewed by in-house reviewer; mortgage loans with expired hazard insurance; percentage of total loans outside lending area of the organization; net interest income as a percent of average assets; return on common equity; legal risk self-assessment; investments as a percent of total assets; and return on assets;
   evaluating each risk factor to determine at least two ranges of risk level values for each risk factor, one range containing unacceptable risk level values, the other range containing acceptable risk level values, each range of risk level values corresponding to a visual indicia in the form of a different color for each range;
   associating one of a plurality of different risk tolerance levels with each risk factor, the risk tolerance levels indicating a level of tolerance of the risk factor to the operation;
   determining actual risk level values for each of the plurality of risk factors; and
   generating a risk management report having one of the visual indicia colors displayed in conjunction with and adjacent each risk factor, the particular visual indicia color being displayed being dependent on which of the at least two ranges of risk level values the actual risk level value for the associated risk factor is within, and displaying in the report the actual risk level value for each risk factor in proximity to the risk factor and associated visual indicia color, the risk factors, actual risk level values and visual indica colors each being in a line with the lines being parallel to, and near each other, all risk factors having the same risk tolerance level being accumulated in a separate area of the report for each risk tolerance level.

2. A risk assessment and management reporting method according to claim 1, wherein the colors are red and green.

3. A risk assessment and management reporting method according to claim 1, wherein there are three ranges of risk level values, one range containing the unacceptable risk level values, a second range containing marginal risk level values and the third range containing the acceptable risk level values, the visual indicia for each range corresponding to a different color.

4. A risk assessment and management reporting method according to claim 3, wherein the colors are red, yellow and green, respectively.

5. A risk assessment and management reporting method according to claim 1, wherein generating the report comprises preparing a computerized spreadsheet having a first column identifying each of the plurality of risk factors in one of a plurality of rows of the spreadsheet, a second column displaying the risk level values determined for each risk factor in the same one of the plurality of rows as the associated risk factor, and a third column displaying the visual indicia color for the risk level value in the same row.

6. A risk assessment and management reporting method according to claim 5, wherein preparing the computerized spreadsheet further comprises programming a formula for each risk factor into the spreadsheet for comparing the actual risk level value of each risk factor to the at least two ranges of risk level values for each risk factor.

7. A risk assessment and management reporting method according to claim 6, further comprising programming a code for each formula into the spreadsheet for displaying one of the unique visual indicia in the second column dependent upon the result of comparing the actual risk level value to the at least two ranges of risk level values for each risk factor.

8. A risk assessment and management reporting system for a financial operation being managed, the system comprising:

means for identifying a plurality of financial risk factors associated with the financial operation being managed, the risk factors being selected from the group consisting of: late payments received; difference between interest rate on savings and on loans; rate of turnover of employees; days of product in inventory; accounts receivable aging; number of loans in default; gross sales, value of old inventory; value of returns; value of inventory losses; operating costs; net profit; latest compliance regulatory exam rating; quarterly teller over and short count; open audit and regulatory findings over twelve months old; variance of year-to-date budget versus actual operating income; number of branch manager meetings during past twelve months; current internal audit rating; number of branches reporting operating losses; months since last approval of operations policy; loan allowance as percentage of total loans; number of loan officers with portfolios greater than selected amount; asset quality rating; percent of loans to total assets; net interest yield on loan portfolio; number of appraisals not reviewed by in-house reviewer; mortgage loans with expired hazard insurance; percentage of total loans outside lending area of the organization; net interest income as a percent of average assets; return on common equity; legal risk self-assessment; investments as a percent of total assets; and return on assets;

each of the risk factors having at least two different risk level value ranges, each risk level value range corresponding to a different visual indicia color, one range containing unacceptable risk level values and the other range containing acceptable risk level values;

an actual risk level value for each risk factor;

means for associating one of a plurality of different risk tolerance levels with each risk factor, the risk tolerance levels indicating a level of tolerance of the risk factor to the operation; and a graphical risk management report on a computer, the report having one of the visual indicia colors displayed in conjunction with each risk factor, the particular visual indicia color being displayed being dependent on which of the ranges of risk level values the actual risk level value for the associated risk factor is within, the report displaying the actual risk level value for each risk factor in proximity to the risk factor and associated visual indicia color, the risk factors, actual risk levels and visual indica colors each being in a line with the lines being parallel to, and near each other, and risk factors having the same risk tolerance level being accumulated in a separate area of the report for each risk tolerance level.

9. A risk assessment and management reporting system according to claim 8, wherein the colors are red and green.

10. A risk assessment and management reporting system according to claim 8, wherein the ranges of risk level values comprised the one range containing unacceptable risk level values, a second range containing marginal risk level values and the other range being a third range containing the acceptable risk level values.

11. A risk assessment and management reporting system according to claim 10, wherein the colors are red, yellow and green, respectively.

12. A risk assessment and management reporting system according to claim 8, wherein the report comprises a computerized spreadsheet having a first column identifying each of the plurality of risk factors in one of a plurality of rows of the spreadsheet and a second column displaying the unique indicia associated with each risk factor in the same one of the plurality of rows as the associated risk factor and means for publishing the spreadsheet.

13. A risk assessment and management reporting system according to claim 12, wherein the computerized spreadsheet further comprises formula for each risk factor programmed into the spreadsheet, each formula comparing the actual risk level value of the associated risk factor to the at least two ranges of risk level values for the associated risk factor to determine which of the at least two ranges the actual risk level value is within.

14. A risk assessment and management reporting system according to claim 13, further comprising a code programmed into the spreadsheet for each formula for displaying one of the visual indicia in the second column dependent upon the result of comparing the actual risk level value to the at least two ranges of risk level values for each risk factor.

15. A risk assessment and management reporting system according to claim 8, wherein the operation being managed is a bank having a plurality of operational segments.

16. A risk assessment and management reporting system according to claim 15, further comprising means for sorting the risk factors according to the operational segment of the bank the risk factors affect.

17. A risk assessment and management report for a financial operation, the report comprising:

a plurality of separate visible areas each corresponding to one of a plurality of different financial risk tolerance levels;

a plurality of financial risk factors each associated with one of the risk tolerance levels, all of the risk factors having the same risk tolerance level being listed in the same separate visible area, the risk factors being selected from the group consisting of: late payments received; difference between interest rate on savings and on loans; rate of turnover of employees; days of product in inventory; accounts receivable aging; number of loans in default; gross sales, value of old inventory; value of returns; value of inventory losses; operating costs; net profit; latest compliance regulatory exam rating; quarterly teller over and short count; open audit and regulatory findings over twelve months old; variance of year-to-date budget versus actual operating income; number of branch manager meetings during past twelve months; current internal audit rating; number of branches reporting operating losses; months since last approval of operations policy; loan allowance as percentage of total loans; number of loan officers with portfolios greater than selected amount; asset quality rating; percent of loans to total assets; net interest yield on loan portfolio; number of appraisals not reviewed by in-house reviewer; mortgage loans with expired hazard insurance; percentage of total loans outside lending area of the organization; net interest income as a percent of average assets; return on common equity; legal risk self-assessment; investments as a percent of total assets; and return on assets;

at least two ranges of risk level values associated with each of the plurality of risk factors, each of the at least two ranges of risk level values corresponding to a different visual indicia color, one range containing unacceptable risk level values and the other range containing acceptable risk level values;

each risk factor having an actual risk level value, the actual risk level value for each risk factor and the visual indicia color corresponding to the range of risk level values in which the actual risk level value of the risk factor is within being displayed associated with their corresponding risk factor in the corresponding separate area, the actual risk level value for each risk factor being in proximity to the risk factor and associated visual indicia color, the risk factors, actual risk levels and visual indica colors each being in a line with the lines being parallel to, and near each other.

18. An assessment and management report according to claim 17, further comprising a computerized spreadsheet for displaying the plurality of risk factors and the associated unique visual indicia colors.

19. An assessment and management report according to claim 18, wherein for each risk factor, the at least two ranges of risk level values are programmed into the computerized spreadsheet as a formula for comparing with the actual risk level value for the risk factor.

20. An assessment and management report according to claim 19, further comprising a code programmed into the computerized spreadsheet for each risk factor for displaying one of the unique visual indicia in association with the risk factor, dependent upon the result of the comparison of the actual risk level value to the at least two ranges of risk level value for the risk factor.

21. An assessment and management report according to claim 20, wherein the at least two ranges of risk level values for each risk factor comprises three ranges.

22. An assessment and management report according to claim 21, wherein the three ranges are an the unacceptable value range, a marginal value range and the acceptable value range.

23. An assessment and management report according to claim 22, wherein the colors comprise red, yellow and green, respectively.

* * * * *